(12) United States Patent
Chowdhuri (10) Patent No.: US 7,062,582 B1
(45) Date of Patent: Jun. 13, 2006

(54) METHOD AND APPARATUS FOR BUS ARBITRATION DYNAMIC PRIORITY BASED ON WAITING PERIOD

(75) Inventor: Bhaskar Chowdhuri, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 199 days.

(21) Appl. No.: 10/390,431

(22) Filed: Mar. 14, 2003

(51) Int. Cl.
*G06F 13/364* (2006.01)
*G06F 13/38* (2006.01)

(52) U.S. Cl. .................... 710/116; 710/241; 370/462
(58) Field of Classification Search ............... 710/111, 710/113, 117, 241, 316, 317, 262; 711/158; 345/535; 370/235
See application file for complete search history.

(56) References Cited

U.S. PATENT DOCUMENTS

| | | | | |
|---|---|---|---|---|
| 4,672,536 A | * | 6/1987 | Giroir et al. ................. | 710/241 |
| 5,241,632 A | * | 8/1993 | O'Connell et al. .......... | 710/117 |
| 5,528,767 A | | 6/1996 | Chen | |
| 5,778,200 A | * | 7/1998 | Gulick ......................... | 710/113 |
| 5,958,036 A | * | 9/1999 | Burns et al. ................. | 710/262 |
| 6,078,338 A | * | 6/2000 | Horan et al. ................. | 345/535 |
| 6,088,751 A | | 7/2000 | Jaramillo | |
| 6,092,137 A | * | 7/2000 | Huang et al. ................ | 710/111 |
| 6,295,553 B1 | | 9/2001 | Gilbertson et al. | |
| 6,330,647 B1 | * | 12/2001 | Jeddeloh et al. ............ | 711/158 |
| 6,363,452 B1 | * | 3/2002 | Lach ........................... | 710/316 |
| 6,363,466 B1 | | 3/2002 | Anand | |
| 6,430,194 B1 | | 8/2002 | Ilyadis et al. | |
| 6,606,692 B1 | * | 8/2003 | Hill et al. .................... | 711/158 |
| 6,647,449 B1 | * | 11/2003 | Watts ........................... | 710/111 |
| 6,763,418 B1 | * | 7/2004 | Chou et al. .................. | 710/317 |
| 6,810,455 B1 | * | 10/2004 | Wyland ....................... | 710/113 |
| 6,842,423 B1 | * | 1/2005 | Erimli et al. ................ | 370/235 |

FOREIGN PATENT DOCUMENTS

EP     1 187 029 A2     3/2002

* cited by examiner

*Primary Examiner*—Glenn A. Auve
*Assistant Examiner*—Christopher E. Lee (57) ABSTRACT

Various approaches grant access to a shared resource. An arbitration circuit includes request shapers that each receive a request from one of the requestors and assign a respective predetermined priority level and age to each of the requests. An arbiter core receives the requests and grants access to the shared resource to each of the requestors corresponding to the requests. The arbiter core includes a mask circuit that includes a plurality of mask registers each corresponding to a respective one of the priority levels. The age of a respective one of the requests increases when the corresponding one of the requestors is not granted access to the shared resource. The priority level of a respective one of the requests increases according to the age of the respective one of the requests.

28 Claims, 10 Drawing Sheets

METHOD AND APPARATUS FOR BUS ARBITRATION DYNAMIC PRIORITY BASED ON WAITING PERIOD

BACKGROUND

The present invention relates generally to arbitration of access to a shared resource. More particularly, the present invention relates to bus arbitration using dynamic priorities based on the waiting periods of the requests for the bus.

In many technologies, and especially in the arena of electronic computers, a scarce resource is shared among competing interests. For example, a shared bus in a computer is shared among several requesters. In such an environment, an efficient and simple arbitration scheme is desirable in order to increase the utilization of the bus, to increase bus access for the requesters, and to reduce the cost of the computer.

One conventional arbitration scheme simply assigns a fixed priority to each requester. According to this scheme, access to the bus is always granted to the requestor having the highest priority. One disadvantage of this approach is that the low-priority requestors rarely, if ever, gain access to the bus.

SUMMARY

In general, in one aspect, the invention features an arbitration circuit for granting access to a shared resource among requesters, comprising a plurality of request shapers each comprising an input unit to receive a request from one of a plurality of the requesters, a priority unit to assign a respective predetermined one of a plurality of priority levels to each of the requests, and an age unit to assign an age to each of the requests when the request is received by the request shaper; and an arbiter core to receive the requests from the request shapers, and to grant access to the shared resource to each of the requestors corresponding to the requests; wherein each of the age units increases the age of a respective one of the requests when the corresponding one of the requesters is not granted access to the shared resource; and wherein each of the priority units increases the priority level of a respective one of the requests, when the corresponding one of the requesters is not granted access to the shared resource, according to the age of the respective one of the requests.

Particular implementations can include one or more of the following features. The arbiter core comprises grant logic to grant access to the shared resource to one of the requestors according to the priority levels and the ages of the requests, comprising a priority encoder to select the one or more of the requests having the highest of the priority levels of the requests, and an arbitration unit to select the one, of the one or more of the requests selected by the priority encoder, having the greatest of the ages. Each of the requests has one of a plurality of delta periods of time, and each of the request shapers further comprises a priority adjuster to cause the respective priority unit to increase the priority level of the respective one of the requests when the age of the request has increased by the delta period of the request and the requestor corresponding to the request has not been granted access to the shared resource. The requests are received during a first interval, wherein the arbiter core further comprises a mask circuit to grant access to the shared resource to all of the requestors corresponding to the requests having one of the priority levels before granting access to the shared resource to requesters corresponding to any further requests having the one of the priority levels and received during a subsequent second interval. The mask circuit comprises a plurality of mask registers each corresponding to a respective one of the priority levels; wherein each of the mask registers stores a plurality of mask bits each corresponding to a respective one of the requesters; and a mask logic to set each of the mask bits when no corresponding request has been received having a corresponding one of the priority levels and the corresponding requestor has not been granted access to the shared resource; wherein the mask logic clears each of the mask bits when a corresponding request is received having a corresponding one of the priority levels. The arbiter core further comprises level filter logic to pass each of the requests to the grant logic only when the mask bit corresponding to the request is set. The shared resource is a shared communication bus; and wherein the requestors are communication units sharing the communication bus to exchange data.

In general, in one aspect, the invention features a method and computer-readable media for granting access to a shared resource among requesters. It comprises receiving a request from each of a plurality of the requesters; assigning a respective predetermined one of a plurality of priority levels to each of the requests; assigning an age to each of the requests when the request is received; and granting access to the shared resource to each of the requests, comprising granting access to the shared resource to the requestor corresponding to the one of the requests having the highest priority level and the greatest age, increasing the age of each of the requests corresponding to requestors that were not granted access to the shared resource, and increasing the priority level of each of the requests corresponding to requestors that were not granted access to the shared resource according to the age of the request.

Particular implementations can include one or more of the following features. Granting access to the shared resource to each of the requests comprises, when only one of the requests has a highest one of the priority levels of the requests, granting access to the shared resource to the requester corresponding to the one of the requests having the highest priority level of the requests, and when more than one of the requests has the highest one of the priority levels of the requests, granting access to the shared resource to the requestor corresponding to the one of the requests having the highest one of the priority levels of the requests and the greatest age. Each of the requests has one of a plurality of delta periods of time, and wherein increasing the priority level of each of the requests corresponding to requesters that were not granted access to the shared resource according to the age of the request comprises increasing the priority level of each of the requests corresponding to requestors that were not granted access to the shared resource when the age of the request has increased by the delta period of the request. The requests are received during a first interval, and implementations further comprise receiving one or more further requests during a subsequent second interval; and granting access to the shared resource to all of the requesters corresponding to the requests having one of the priority levels before granting access to the shared resource to any of the requestors corresponding to the further requests having the one of the priority levels.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Figure 1:
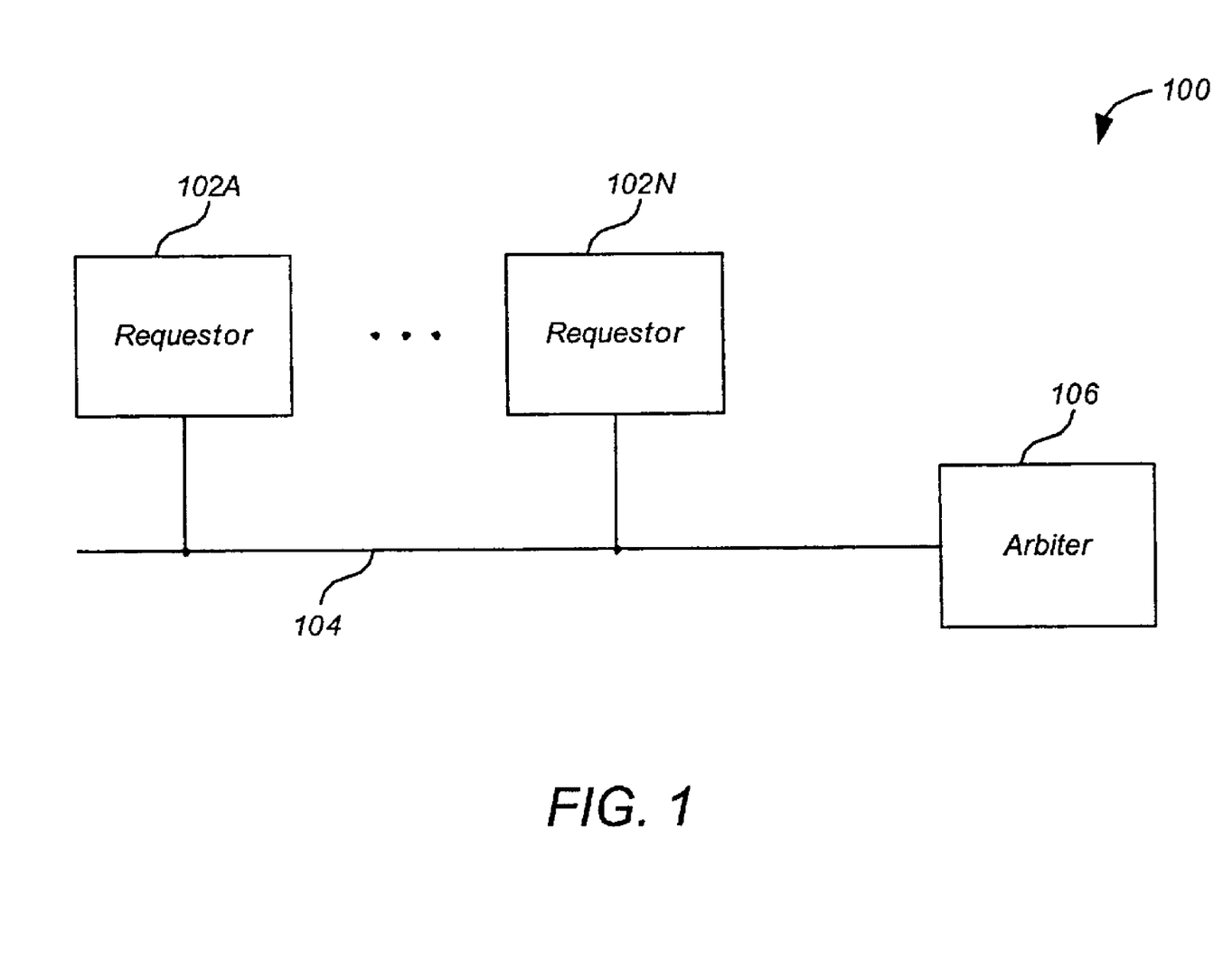
FIG. 1 shows a communication system comprising a plurality of requesters sharing a shared bus under the control of an arbiter.

FIG. 1 shows a communication system 100 comprising a plurality of requesters 102A through 102N sharing a shared bus 104 under the control of an arbiter 106. In a preferred embodiment, the requestors are communication units sharing the communication bus to exchange data. However, while embodiments of the invention are described with reference to communication system 100, other embodiments apply to other sorts of systems.

Figure 2:
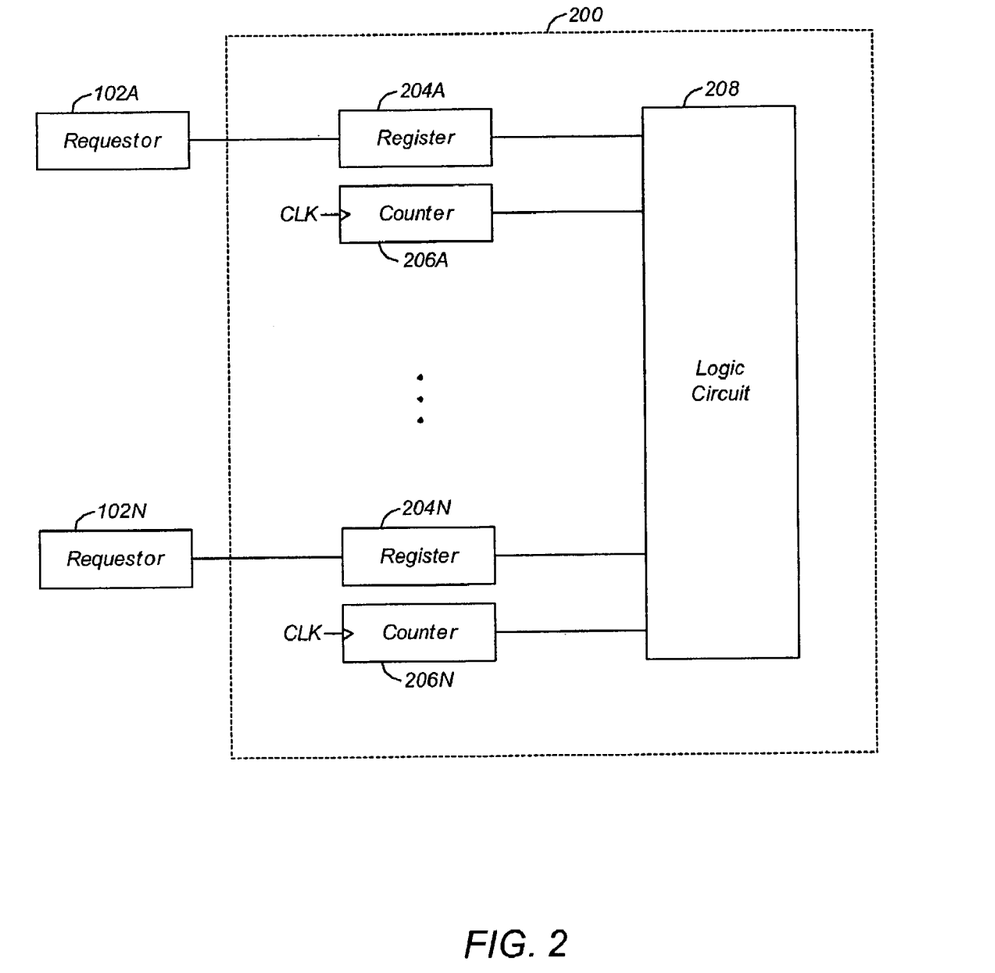
FIG. 2 shows an arbiter that can serve as arbiter in the communication system of FIG. 1 according to a preferred embodiment.

FIG. 2 shows an arbiter 200 that can serve as arbiter 106 in communication system 100 of FIG. 1 according to a preferred embodiment. Arbiter 200 comprises a plurality of registers 204A through 204N, a plurality of counters 206A through 206N, and a logic circuit 208.

Figure 3:
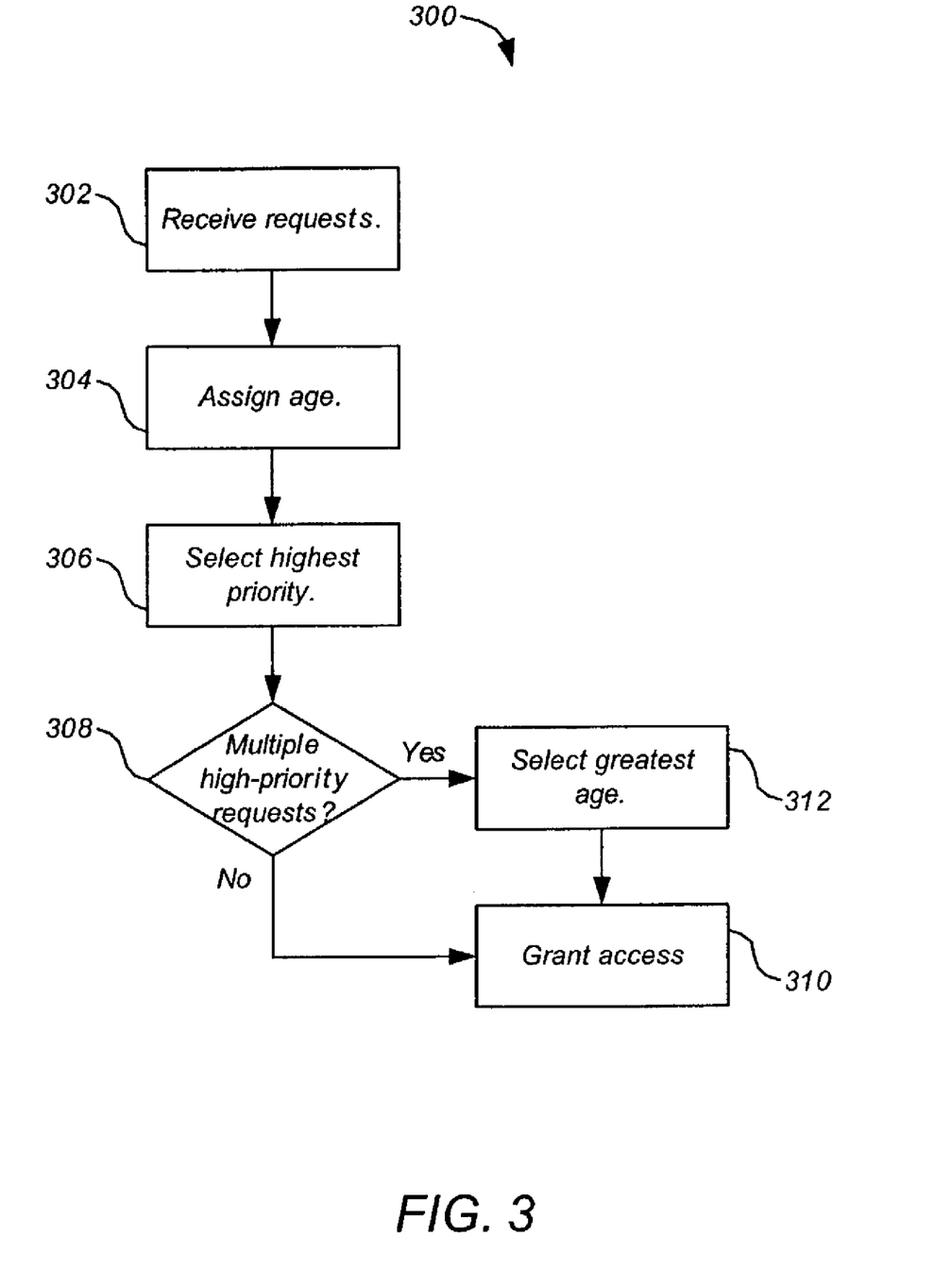
FIG. 3 shows a process performed by the arbiter of FIG. 2 according to a preferred embodiment.

FIG. 3 shows a process 300 performed by arbiter 200 according to a preferred embodiment. Arbiter 200 receives a plurality of requests from requesters 102 (step 302). Each request has one of a plurality of priority levels. The priority level of each request is stored in a respective one of registers 204. When a request is received, an age is preset in a respective one of counters 206 (step 304). Preferably the preset age is zero, although other values can be used. Each counter 206 increments the value stored therein according to a clock signal CLK, thereby increasing the age of each request as time passes.

Logic circuit 208 grants access to bus 104 to one of requestors 102 in the following manner. Logic circuit 208 examines registers 204 to select the request having the highest priority level among the received requests (step 306). If only one of the requests has the highest priority of the received requests (step 308), logic circuit 208 grants access to bus 104 to the requestor 102 corresponding to the selected request (step 310). However, if more than one of the requests has the highest priority of the received requests (step 308), logic circuit 208 examines the counters 206 for those requests to select the request having greatest age among the received requests having the highest priority level (step 312). Logic circuit 208 then grants access to bus 104 to the requestor 102 corresponding to the selected request (step 310).

Arbiter 200 of FIG. 2 is a very efficient arbiter, but requires a significant amount of logic that is limited in speed. In general, arbiter 200 therefore introduces an extra bus cycle, thus slowing the operation of communications system 100 of FIG. 1.

Figure 4:
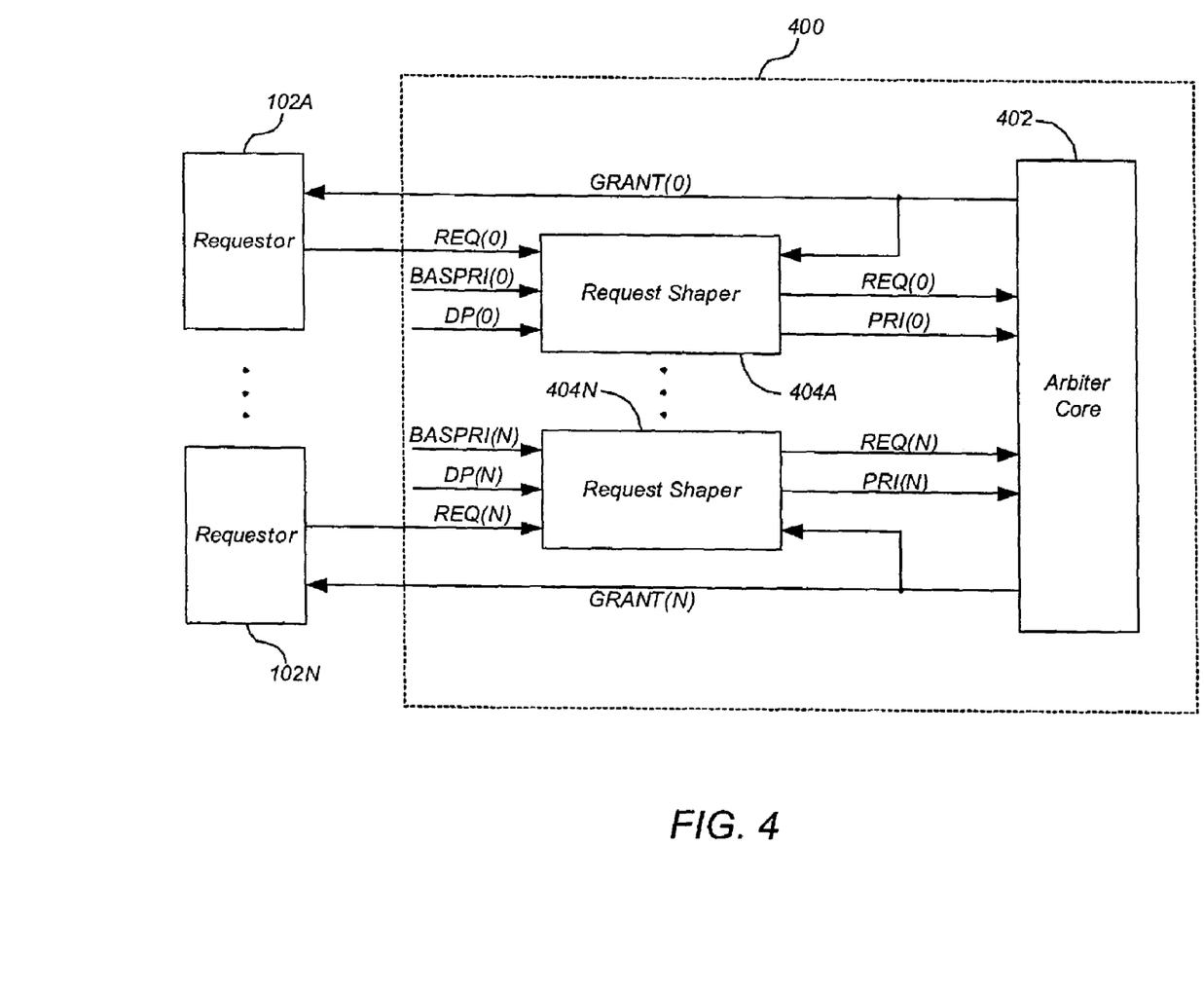
FIG. 4 shows an arbiter that can serve as the arbiter in the communication system of FIG. 1 according to a preferred embodiment.

FIG. 4 shows an arbiter 400 that can serve as arbiter 106 in communication system 100 of FIG. 1 according to a preferred embodiment. Arbiter 400 comprises an arbiter core 402 and a plurality of request shapers 404A through 404N. Each of request shapers 404 receives a request signal REQ from a respective one of the N requestors 102. When a signal REQ goes high, the respective request shaper 404 passes the REQ signal to arbiter core 402, along with a priority level signal PRI that represents a priority level of the request. The request shaper 404 initially determines the priority level of the request based on a base priority signal BASPRI. However, request shaper 404 increases the priority level, and therefore modifies the corresponding priority level signal PRI based on the passage of time with reference to a delta period signal DP. Each requester 102 can have a different base priority and delta period.

Arbiter core 402 selects one of the requestors 102 based on the REQ and PRI signals, and sends a GRANT signal to the selected requester 102, and to the corresponding request shaper 404, which clears the request.

Figure 5:
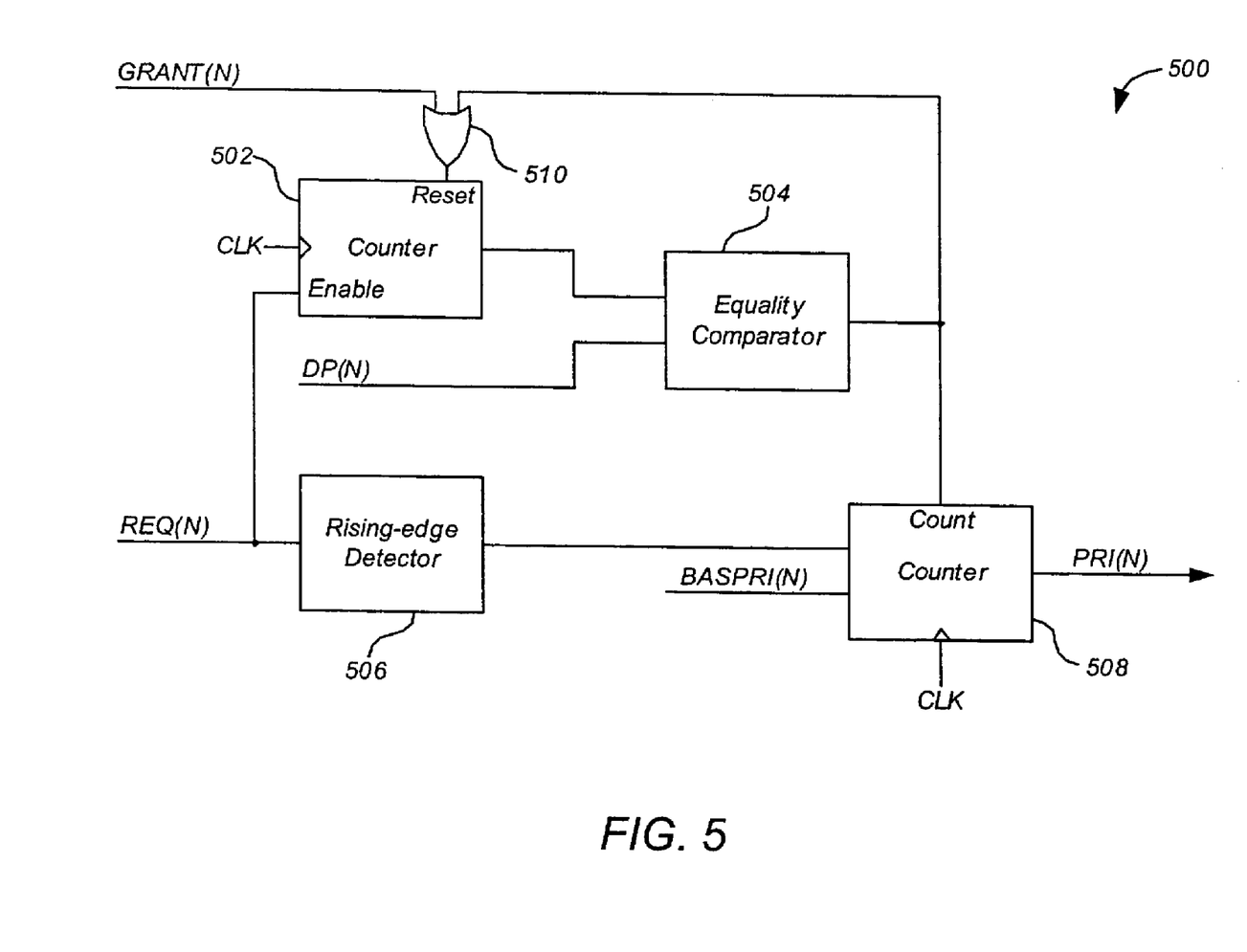
FIG. 5 shows a request shaper that can serve as a request shaper of FIG. 4.

FIG. 5 shows a request shaper 500 that can serve as a request shaper 404 of FIG. 4. Request shaper 500 comprises up-counters 502 and 508, equality comparator 504, rising-edge detector 506, and OR gate 510. Counter 502 has a reset input that receives the output of OR gate 510, which receives the output of equality comparator 504 and the GRANT(N) signal. When arbiter core 402 receives a request signal REQ(N), the request signal enables counter 502, thereby causing counter 502 to age the request by counting cycles of clock signal CLK. Rising-edge detector 506 loads counter 508 according to the base priority signal BASPRI(N) on receipt of the request signal. The base priority signal represents the initial priority assigned to requests received from the corresponding requestor. The initial priority is programmable.

Equality comparator 504 compares the count in counter 502 to the delta period signal DP(N), which represents a value that is programmable. When the count in the counter 502 reaches the delta period, the output of equality comparator 504 goes high, resetting counter 502 and incrementing counter 508. Thus with the expiration of each delta period, the priority of a request is increased by one, up to the maximum priority level. Of course, the priority can be increased by other values instead. The count of counter 508 is output as signal PRI(N).

When the request is granted, counter 508 is reset.

Figure 6:
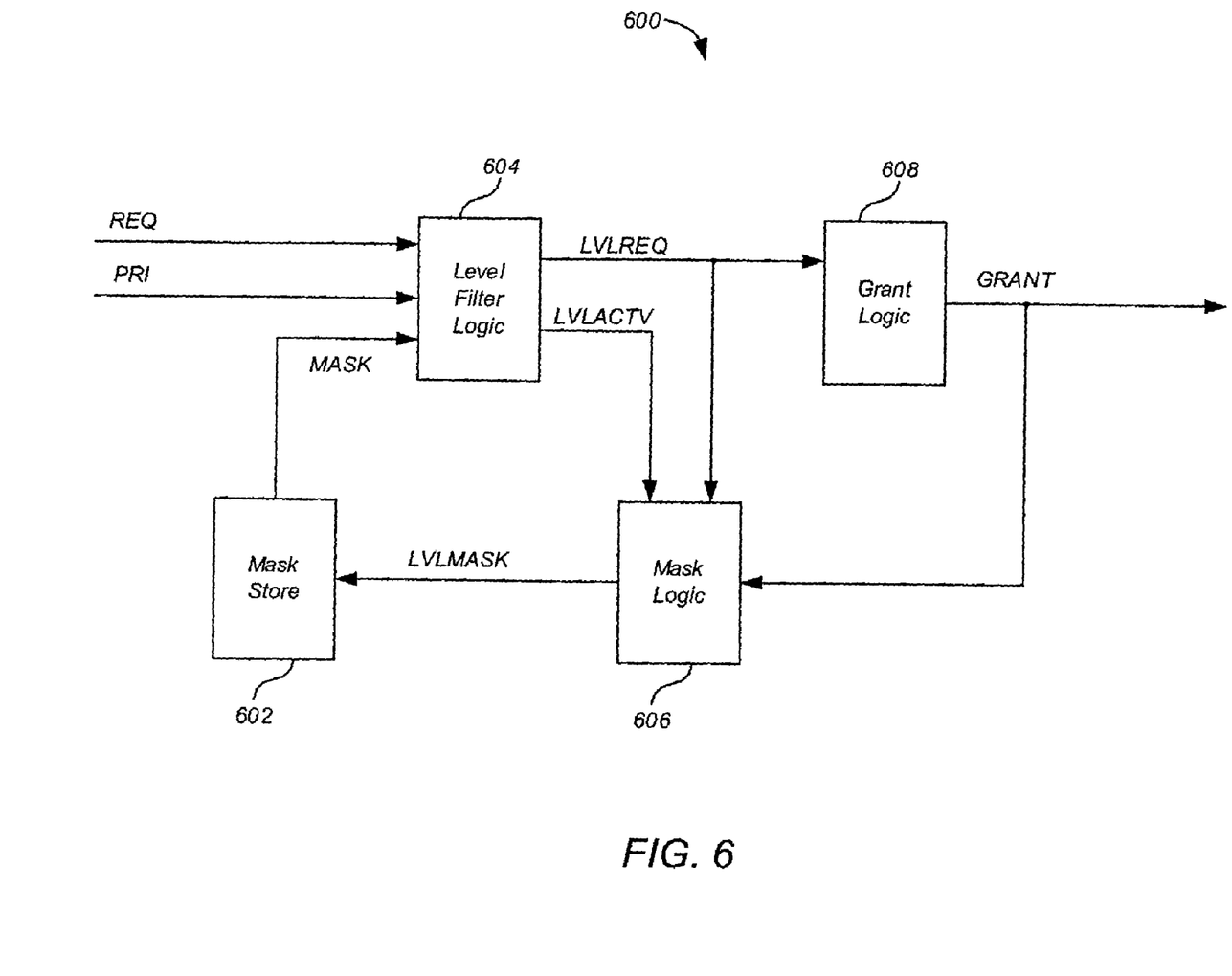
FIG. 6 shows an arbiter core that can serve as the arbiter core of FIG. 2.

FIG. 6 shows an arbiter core 600 that can serve as arbiter core 402 of FIG. 2. Arbiter core 600 comprises a mask store 602, level filter logic 604, mask logic 606, grant logic 608, and a bus monitor 610. Level filter logic 604 receives the REQ and PRI request signals from requestors 102, filters those request signals according to the contents of mask store 602, and generates signals LVLREQ and LVLACTV in accordance with the contents of mask store 602. Signal LVLREQ comprises N×I signals LVLREQ(N,I) where N is the number of requestors 102 and I is the number of priority levels. When high, each signal LVLREQ(N,I) indicates that arbiter core 402 is receiving a request signal from requestor 102N having a priority level I, and that the request has not been masked, as discussed in detail below. The LVLACTV signal comprises I signals LVLACTV(I). When high, each LVLACTV(I) signal indicates that arbiter core 402 is receiving a request from at least one of requesters 102 that has a priority level I.

In response to signals GRANT, LVLREQ and LVLACTV, mask logic 606 modifies the contents of mask store 602, as described in detail below. The contents of mask store 602 are provided to level filter logic 604.

Bus monitor 610 monitors the status of bus 104. When bus 104 is idle, bus monitor 610 causes a signal ALLOW_NEXT_ARB to be high. Signal LVLREQ is also provided to grant logic 608. When signal ALLOW_NEXT_ARB is high, and in response to signal LVLREQ, grant logic 608 modifies the GRANT signal, which comprises N signals GRANT(N), one for each requestor 102, thereby granting bus 104 to one of the requesters 102. When signal ALLOW_NEXT_ARB is low, indicating that bus 104 is not idle, grant logic 608 does not modify the GRANT signal. This method prevents the interruption of a current bus access by the requestor 102 previously granted access to bus 104.

Figure 7:
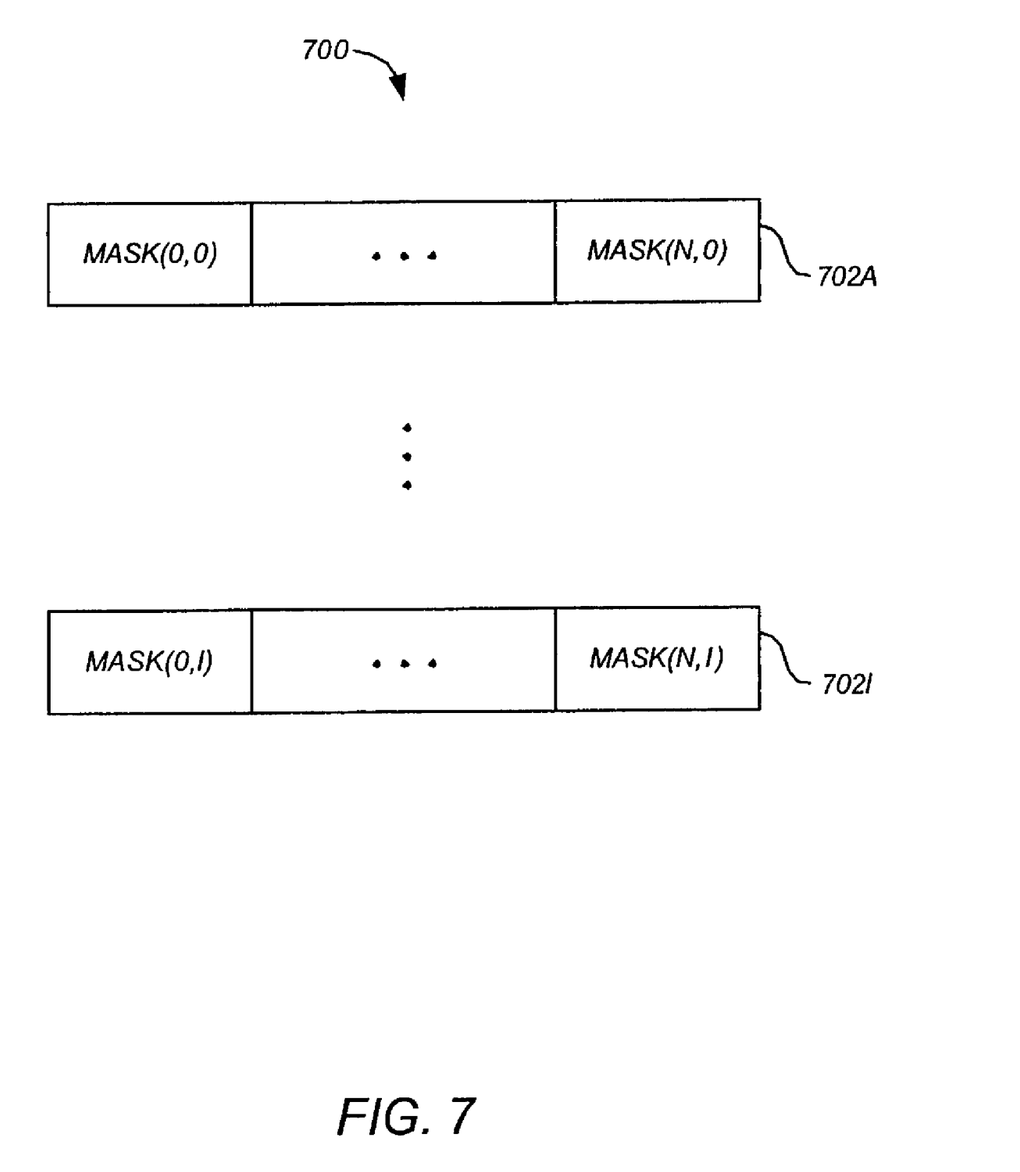
FIG. 7 shows a mask store that can serve as the mask store of FIG. 6.

FIG. 7 shows a mask store 700 that can serve as mask store 602 of FIG. 6. Mask store 700 comprises 1 N-bit registers 702A through 702I. Each register 702 corresponds to one of the I priority levels, and stores a mask bit for each of the N requesters 102. When a mask bit is clear (that is, zero), arbiter core 402 will not accept a new request from the requester represented by that mask bit at the priority level represented by the mask register 702 storing that mask bit.

Figure 8:
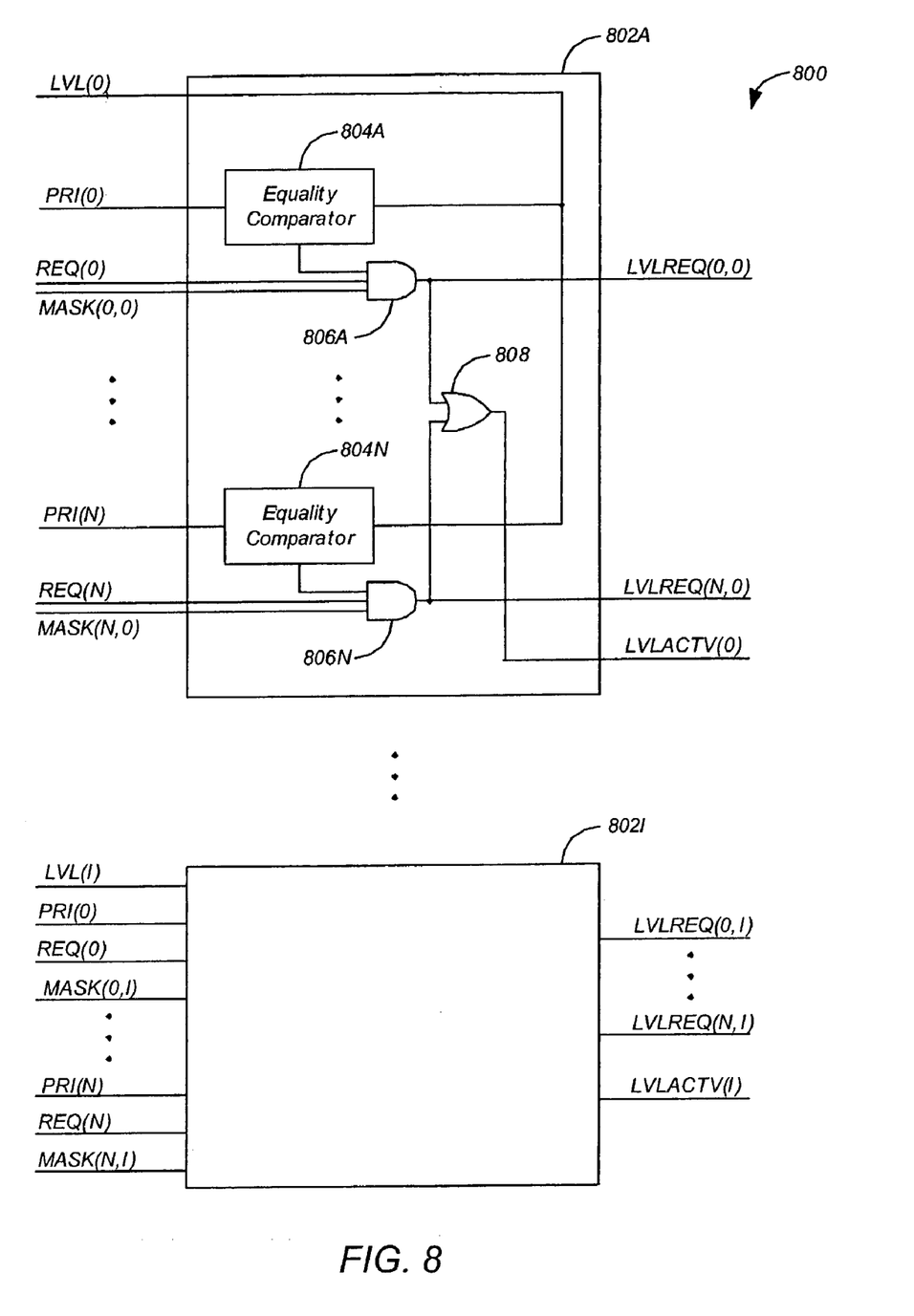
FIG. 8 shows a level filter logic that can serve as the level filter logic of FIG. 6.

FIG. 8 shows a level filter logic 800 that can serve as level filter logic 604 of FIG. 6. Level filter logic 800 comprises I level filters 802A through 802I, each corresponding to one of the I priority levels. To avoid repetition, only one 802A of level filters 802 is described. The remaining level filters 802 are similar to level filter 802A.

Level filter 802A corresponds to the lowest priority level (PRI=0) and comprises N equality comparators 804A through 804N and N AND gates 806A through 806N, each pair representing one of the N requesters 102, and an OR gate 808. Each equality comparator 804 receives a LVL signal that indicates the priority level I served by that level filter. Each equality comparator also receives a respective one of the PRI signals. When arbiter core 402 receives a request having PRI=0, the output of the equality comparator 804 in level filter 802A (which corresponds to PRI=0) that corresponds to the requestor 102 sending the request goes high. If the REQ signal for that requestor 102 and the mask bit MASK(N,I) for that request are also high, the output of the corresponding AND gate 806 goes high. For example, if arbiter core 402 receives from requester 102N a request (REQ(7)=1) with a priority level of 0 (PRI(7)=0), and the corresponding mask bit MASK(7,0) is set, then the output of AND gate 806N of level filter 802A, which is a signal LVLREQ(7,0) goes high, indicating that arbiter core 402 has received a request from requestor 102N at priority level 0 that is not masked.

All of the signals LVLREQ(N,I) produced by level filter 802A are fed to OR gate 808, which outputs a signal LVLACTV(0) that goes high when arbiter core 402 receives a request having a priority level of PRI=0.

Figure 9:
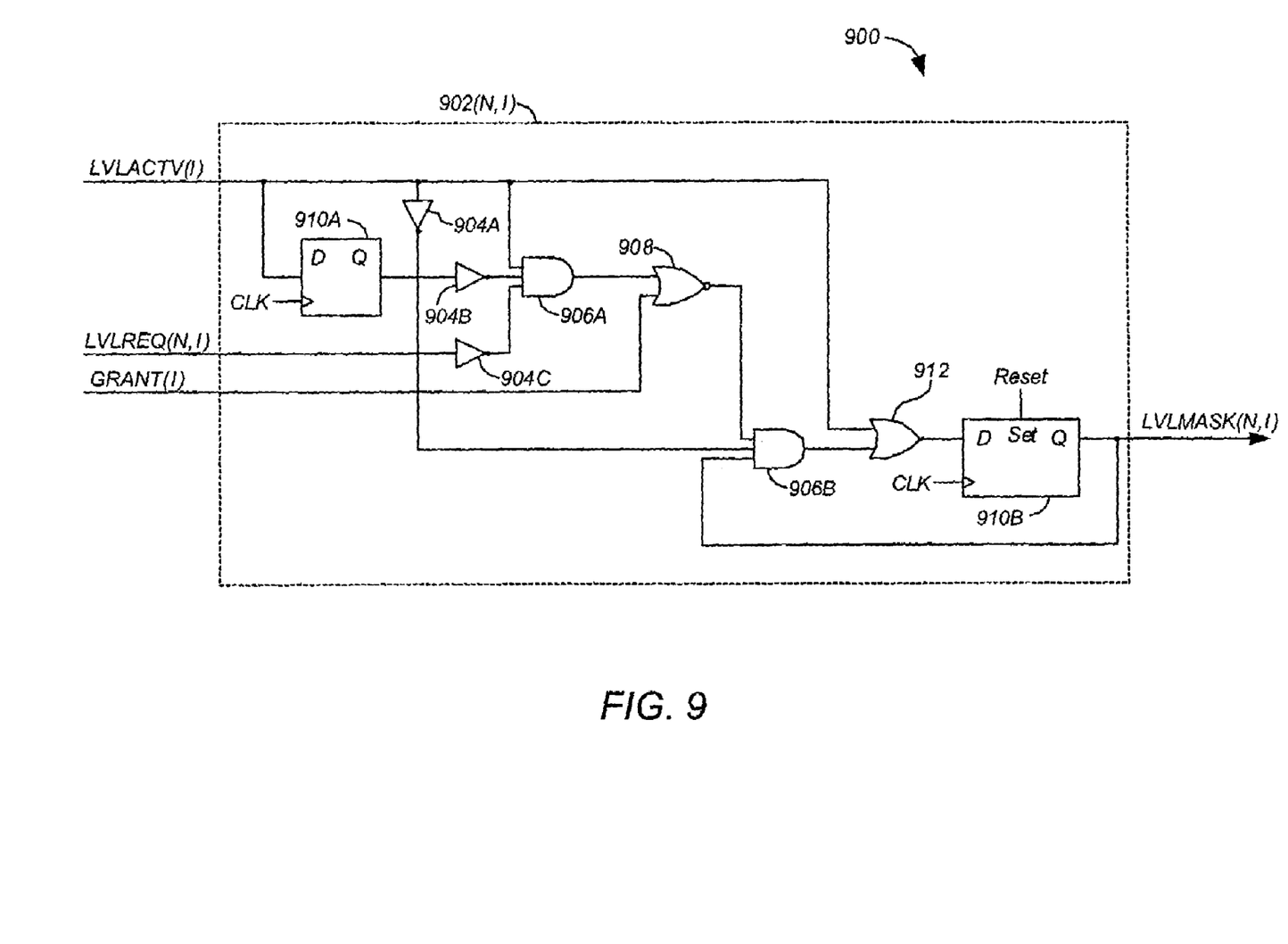
FIG. 9 shows a mask logic that can serve as the mask logic of FIG. 6.

FIG. 9 shows a mask logic 900 that can serve as mask logic 606 of FIG. 6. Mask logic 900 comprises N×I logic units 902, each of which corresponds to one of the N requestors 102 and one of the I priority levels. To avoid repetition, only one 902(N,I) of logic units 902 is shown and described. The other logic units 902 are similar.

Logic unit 902(N,I) comprises inverters 904A, 904B, and 904C, AND gates 906A and 906B, NOR gate 908, OR gate 912, and flip-flops 910A and 910B, which are clocked by a clock signal CLK. Flip-flop 910A receives signal LVLACTV(I) and provides a delayed version of that signal to inverter 904B, which provides its output to AND gate 906A. AND gate 906A also receives signal LVLACTV(I), and receives signal LVLREQ(N,I) after inversion by inverter 904C. NOR gate 908 receives the GRANT(I) signal and the output of AND gate 906A. AND gate 906B receives the outputs of NOR gate 908 and flip-flop 910B, and receives the signal LVLACTV(I) after inversion by inverter 904A. OR gate 912 receives the output of AND gate 906B and signal LVLACTV(I). The output of flip-flop 910B is the signal LVLMASK(N,I), which sets and clears the corresponding mask bit MASK(N,I) in mask store 602. On a system reset, the SYSTEM_RESET signal is asserted, which resets all of the flip-flops 910B in mask logic 900. This causes all of the LVLMASK signals to go high, which sets all of the mask bits in mask store 602, thereby permitting all requests to pass through level filter logic 604 to grant logic 608 until the mask bits are modified by level filter logic 604.

Figure 10:
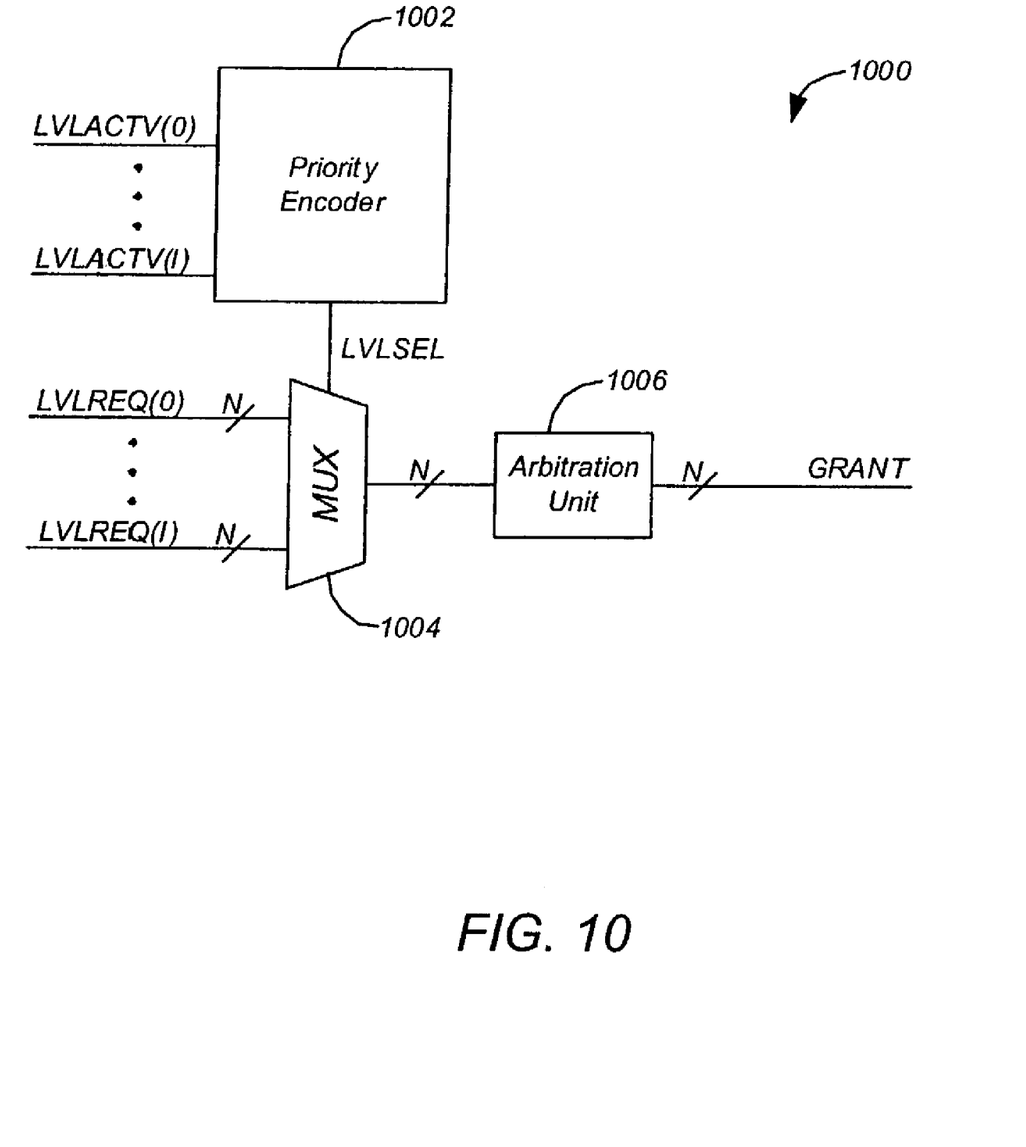
FIG. 10 shows a grant logic that can serve as the grant logic of FIG. 6.

FIG. 10 shows a grant logic 1000 that can serve as grant logic 608 of FIG. 6. Grant logic 1000 comprises an arbitration unit 1006, a priority encoder 1002, and a multiplexer (MUX) 1004.

MUX 1004 receives I signals LVLREQ(I), where each signal LVLREQ(I) is an N-bit signal comprising the corresponding N signals LVLREQ(N,I). For example, in a system having 8 requestors and 16 priority levels, signal LVLREQ (5) for priority level 3 is an 8-bit signal comprising the corresponding 8 signals LVLREQ(0,5) through LVLREQ(7, 5).

Priority encoder 1002 receives the I signals LVLACTV(0) through LVLACTV(I). As described above, each LVLACTV signal when high indicates that there is a pending request (that is, a request received and not masked, but not yet granted) of the corresponding priority level. Priority encoder 1002 selects the highest priority having a pending request, and passes that selection to MUX 1004 as signal LVLSEL, which causes MUX 1004 to pass to arbitration unit 1006 the signal LVLREQ(I) corresponding to the priority level I selected by priority encoder 1002. Priority encoder 1002 is preferably implemented as a conventional logic circuit according to well-known techniques.

The signal LVLREQ(I) received by arbitration unit 1006 represents all of the pending requests having the highest priority of the pending requests. Arbitration unit 1006 selects one of those requests according to a conventional priority scheme such as a fixed priority scheme, a fairness priority scheme, and the like, and issues a GRANT signal to the requestor 102 corresponding to the selected request. Arbitration unit 1006 is preferably implemented as a conventional logic circuit according to well-known techniques.

Arbiter 400 of FIG. 4 is an efficient arbiter, and requires substantially less logic than arbiter 200 of FIG. 2. In a 0.15-micron CMOS logic implementation, arbiter 400 of FIG. 4 requires approximately 8,000 gates, and can operate at clock rates above 150 MHz.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An arbitration circuit for granting access to a shared resource among requestors, comprising:
   a plurality of request shapers each comprising
      an input unit to receive a request from one of a plurality of the requesters,
      a priority unit to assign a respective predetermined one of a plurality of priority levels to each of the requests, and
      an age unit to assign an age to each of the requests when the request is received by the request shaper; and
   an arbiter core to receive the requests from the request shapers, and to grant access to the shared resource to each of the requestors corresponding to the requests;
   wherein the arbiter core comprises:
      a mask circuit,
         wherein the mask circuit comprises:
            a plurality of mask registers each corresponding to a respective one of the priority levels:
      wherein each of the age units increases the age of a respective one of the requests when the corresponding one of the requestors is not granted access to the shared resource; and
      wherein each of the priority units increases the priority level of a respective one of the requests, when the corresponding one of the requestors is not granted access to the shared resource, according to the age of the respective one of the requests.

2. The arbitration circuit of claim 1, wherein the arbiter core comprises:
   grant logic to grant access to the shared resource to one of the requesters according to the priority levels and the ages of the requests, comprising
      a priority encoder to select the one or more of the requests having the highest of the priority levels of the requests, and
      an arbitration unit to select the one, of the one or more of the requests selected by the priority encoder, having the greatest of the ages.

3. The arbitration circuit of claim 1, wherein each of the requests has one of a plurality of delta periods of time, and wherein each of the request shapers further comprises:
   a priority adjuster to cause the respective priority unit to increase the priority level of the respective one of the requests when the age of the request has increased by the delta period of the request and the requestor corresponding to the request has not been granted access to the shared resource.

4. The arbitration circuit of claim 3, wherein the input unit comprises a rising-edge detector configured to receive the request from one of the plurality of the requestors,
   wherein the age unit comprises a first counter configured to age the request by counting clock cycles upon receipt of the request,
   wherein the priority unit comprises a second counter in communication with the rising-edge detector and configured to output the priority level for the request,
   wherein the priority adjuster comprises a comparator in communication with the first and second counters,
   wherein the rising-edge detector is configured to load the second counter in accordance with a base priority upon receipt of the request,
   wherein the comparator in configured to compare a count in the first counter with the delta period of time of the request, and
   wherein when the count in the first counter is substantially equal to the delta period of time, the comparator is configured to reset the first counter and increment the second counter to increase the priority level of the request by a predetermined value.

5. The arbitration circuit of claim 1, wherein the requests are received during a first interval, and
   wherein the mask circuit grants access to the shared resource to all of the requestors corresponding to the requests having one of the priority levels before granting access to the shared resource to requestors corresponding to any further requests having the one of the priority levels and received during a subsequent second interval.

6. The arbitration circuit of claim 1,
   wherein each of the mask registers stores a plurality of mask bits each corresponding to a respective one of the requesters; and
   wherein the mask circuit comprises:
      a mask logic to set each of the mask bits when no corresponding request has been received having a corresponding one of the priority levels and the corresponding requester has not been granted access to the shared resource;
         wherein the mask logic clears each of the bask bits when a corresponding request is received having a corresponding one of the priority levels.

7. The arbitration circuit of claim 6, wherein the arbiter core further comprises:
   level filter logic to pass each of the requests to grant logic only when the mask bit corresponding to the request is set.

8. The arbitration circuit of claim 1,
   wherein the shared resource is a shared communication bus; and wherein the requestors are communication units sharing the communication bus to exchange data.

9. An arbitration circuit for granting access to a shared resource among requestors, comprising:
a plurality of request shaper means each comprising
input unit means for receiving a request from one of a plurality of the requesters,
priority unit means for assigning a respective predetermined one of a plurality of priority levels to each of the requests, and
age unit means for assigning an age to each of the requests when the request is received by the request shaper means; and
arbiter core means for receiving the requests from the request shaper means, and for granting access to the shared resource to each of the requesters corresponding to the requests;
wherein the arbiter core means comprises:
mask means for granting access to the shared resource,
wherein the mask means comprises:
a plurality of mask register means for storing mask bits,
wherein each of the mask register means corresponds to a respective one of the priority levels;
wherein each of the age unit means increases the age of a respective one of the requests when the corresponding one of the requestors is not granted access to the shared resource; and
wherein each of the priority unit means increases the priority level of a respective one of the requests, when the corresponding one of the requestors is not granted access to the shared resource, according to the age of the respective one of the requests.

10. The arbitration circuit of claim 9, wherein the arbiter core means comprises:
grant logic means for granting access to the shared resource to one of the requestors according to the priority levels and the ages of the requests, comprising
priority encoder means for selecting the one or more of the requests having the highest of the priority levels of the requests, and
arbitration unit means for selecting the one, of the one or more of the requests selected by the priority encoder means, having the greatest of the ages.

11. The arbitration circuit of claim 9, wherein each of the requests has one of a plurality of delta periods of time, and
wherein each of the request shaper means further comprises:
priority adjuster means for causing the respective priority unit means to increase the priority level of the respective one of the requests when the age of the request has increased by the delta period of the request and the requestor corresponding to the request has not been granted access to the shared resource.

12. The arbitration circuit of claim 11, wherein the input unit means comprises means for detecting a rising-edge configured to receive the request from one of the plurality of the requestors,
wherein the age unit means comprises a first means for counting configured to age the request by counting clock cycles upon receipt of the request,
wherein the priority unit means comprises a second means for counting in communication with the rising-edge detector and configured to output the priority level for the request,
wherein the priority adjuster means comprises a means for comparing in communication with the first and second counting means,
wherein the rising-edge detecting means is configured to load the second counting means in accordance with a base priority upon receipt of the request,
wherein the comparing means in configured to compare a count in the first counting means with the delta period of time of the request, and
wherein when the count in the first counting means is substantially equal to the delta period of time, the comparing means is configured to reset the first counting means and increment the second counting means to increase the priority level of the request by a predetermined value.

13. The arbitration circuit of claim 9, wherein the requests are received during a first interval, and
wherein the mask means grants access to the shared resource to all of the requesters corresponding to the requests having one of the priority levels before granting access to the shared resource to requestors corresponding to any further requests having the one of the priority levels and received during a subsequent second interval.

14. The arbitration circuit of claim 9,
wherein each of the mask register means stores a plurality of the mask bits each corresponding to a respective one of the requestors; and
wherein the mask means comprises:
mask logic means for
setting each of the mask bits when no corresponding request has been received having a corresponding one of the priority levels and the corresponding requestor has not been granted access to the shared resource, and
clearing each of the mask bits when a corresponding request is received having a corresponding one of the priority levels.

15. The arbitration circuit of claim 14, wherein the arbiter core means further comprises:
level filter logic means for passing each of the requests to grant logic means only when the mask bit corresponding to the request is set.

16. The arbitration circuit of claim 9,
wherein the shared resource is a shared communication bus; and
wherein the requesters are communication units sharing the communication bus to exchange data.

17. A method for granting access to a shared resource among requesters, comprising:
receiving a request from each of a plurality of the requesters;
assigning a respective predetermined one of a plurality of priority levels to each of the requests;
assigning a respective one of the priority levels to each of a plurality of mask data storage locations;
assigning an age to each of the requests when the request is received; and
granting access to the shared resource to each of the requests, comprising
granting access to the shared resource to the requestor corresponding to the one of the requests having the highest priority level and the greatest age,
increasing the age of each of the requests corresponding to requestors that were not granted access to the shared resource, and increasing the priority level of each of the requests corresponding to requestors that were not granted access to the shared resource according to the age of the request.

18. The method of claim 17, wherein granting access to the shared resource to each of the requests comprises:
when only one of the requests has a highest one of the priority levels of the requests, granting access to the shared resource to the requester corresponding to the one of the requests having the highest priority level of the requests, and
when more than one of the requests has the highest one of the priority levels of the requests, granting access to the shared resource to the requestor corresponding to the one of the requests having the highest one of the priority levels of the requests and the greatest age.

19. The method of claim 17, wherein each of the requests has one of a plurality of delta periods of time, and
wherein increasing the priority level of each of the requests corresponding to requestors that were not granted access to the shared resource according to the age of the request comprises:
increasing the priority level of each of the requests corresponding to requesters that were not granted access to the shared resource when the age of the request has increased by the delta period of the request.

20. The method of claim 19, comprising
aging the request from one of the plurality of the requesters by counting clock cycles upon receipt of the request,
wherein the predetermined one of the priority levels is assigned to the request in accordance with a base priority upon receipt of the request,
comparing a count of clock cycles with the delta period of time of the request,
wherein when the count is substantially equal to the delta period of time, the method comprises:
resetting the count; and
increasing the priority level of the request by a predetermined value; and
outputting the priority level for the request.

21. The method of claim 17, wherein the requests are received during a first interval, further comprising:
receiving one or more further requests during a subsequent second interval; and
granting access to the shared resource to all of the requesters corresponding to the requests having one of the priority levels before granting access to the shared resource to any of the requesters corresponding to the further requests having the one of the priority levels.

22. The method of claim 17, comprising:
storing a plurality of mask indicators in each of the plurality of mask data storage locations,
wherein each of the mask indicators corresponds to a respective one of the requestors;
setting each of the mask indicators when no corresponding request has been received having a corresponding one of the priority levels and the corresponding requester has not been granted access to the shared resource; and
clearing each of the mask indicators when a corresponding request is received having a corresponding one of the priority levels.

23. Computer-readable media embodying instructions executable by a computer to perform a method for granting access to a shared resource among requestors, the method comprising:
receiving a request from each of a plurality of the requestors;
assigning a respective predetermined one of a plurality of priority levels to each of the requests;
assigning a respective one of the priority levels to each of a plurality of mask data storage locations;
assigning an age to each of the requests when the request is received; and
granting access to the shared resource to each of the requests, comprising
granting access to the shared resource to the requestor corresponding to the one of the requests having the highest priority level and the greatest age,
increasing the age of each of the requests corresponding to requestors that were not granted access to the shared resource, and
increasing the priority level of each of the requests corresponding to requestors that were not granted access to the shared resource according to the age of the request.

24. The media of claim 23, wherein granting access to the shared resource to each of the requests comprises:
when only one of the requests has a highest one of the priority levels of the requests, granting access to the shared resource to the requester corresponding to the one of the requests having the highest priority level of the requests, and
when more than one of the requests has the highest one of the priority levels of the requests, granting access to the shared resource to the requester corresponding to the one of the requests having the highest one of the priority levels of the requests and the greatest age.

25. The media of claim 23, wherein each of the requests has one of a plurality of delta periods of time, and
wherein increasing the priority level of each of the requests corresponding to requesters that were not granted access to the shared resource according to the age of the request comprises:
increasing the priority level of each of the requests corresponding to requestors that were not granted access to the shared resource when the age of the request has increased by the delta period of the request.

26. The media of claim 23, wherein the method comprises:
aging the request from one of the plurality of the requesters by counting clock cycles upon receipt of the request,
wherein the predetermined one of the priority levels is assigned to the request in accordance with a base priority upon receipt of the request,
comparing a count of clock cycles with the delta period of time of the request,
wherein when the count is substantially equal to the delta period of time, the method comprises:
resetting the count; and
increasing the priority level of the request by a predetermined value; and
outputting the priority level for the request.

27. The media of claim 23, wherein the requests are received during a first interval, and wherein the method further comprises:

receiving one or more further requests during a subsequent second interval; and granting access to the shared resource to all of the requestors corresponding to the requests having one of the priority levels before granting access to the shared resource to any of the requesters corresponding to the further requests having the one of the priority levels.

28. The media of claim 23, wherein the method comprises:

storing a plurality of mask indicators in each of the plurality of mask data storage locations, wherein each of the mask indicators corresponds to a respective one of the requesters;

setting each of the mask indicators when no corresponding request has been received having a corresponding one of the priority levels and the corresponding requestor has not been granted access to the shared resource; and clearing each of the mask indicators when a corresponding request is received having a corresponding one of the priority levels.

* * * * *

UNITED STATES PATENT AND TRADEMARK OFFICE
CERTIFICATE OF CORRECTION

PATENT NO. : 7,062,582 B1
APPLICATION NO. : 10/390431
DATED : June 13, 2006
INVENTOR(S) : Bhaskar Chowdhuri It is certified that error appears in the above-identified patent and that said Letters Patent is hereby corrected as shown below:

Column 8, Line 30     Delete "in" and insert --is--
Column 8, Line 58     Delete "bask" and insert --mask--
Column 10, Line 7     Delete "in" and insert --is--

Signed and Sealed this

Sixth Day of March, 2007

JON W. DUDAS
*Director of the United States Patent and Trademark Office*